Figure 1:
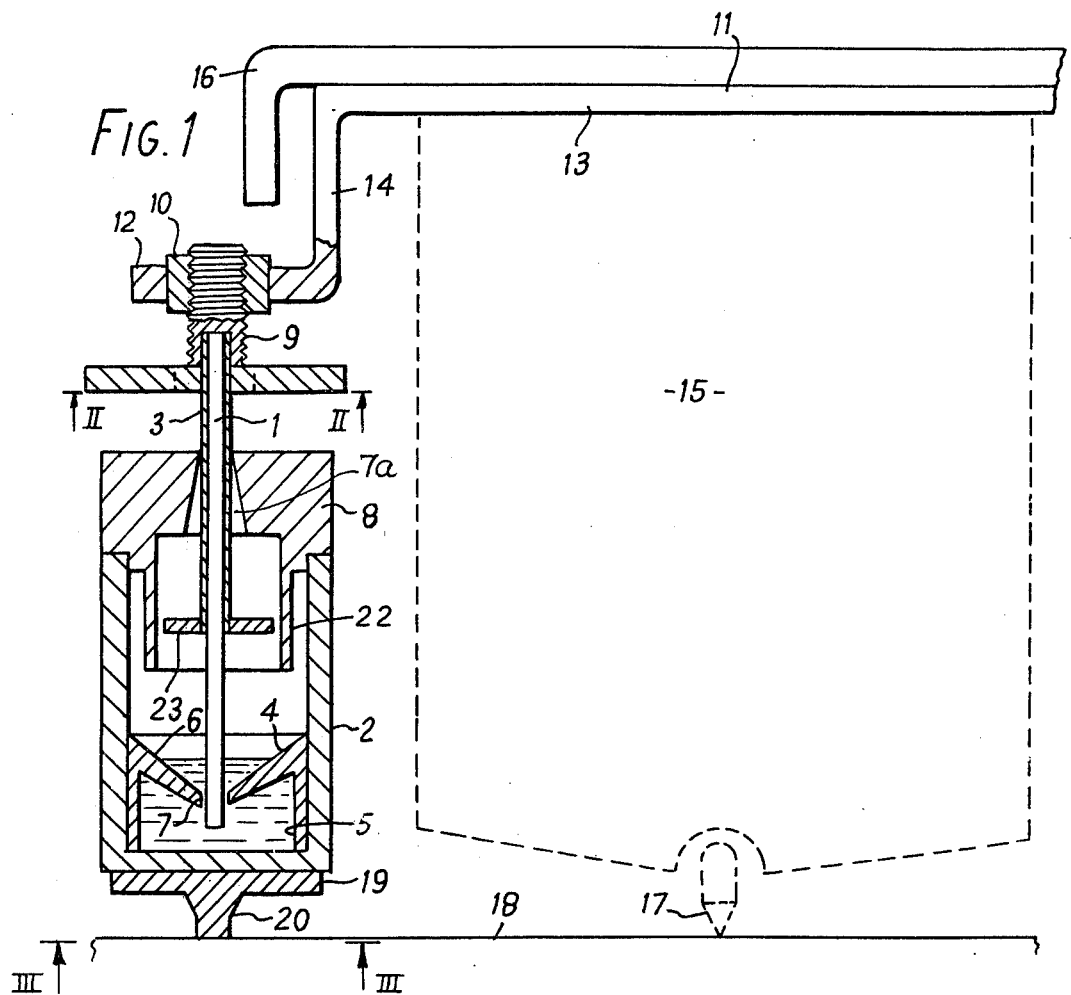

United States Patent [19]

Rangabe

[11] 4,131,284
[45] Dec. 26, 1978

[54] DAMPER MEANS FOR DAMPING THE RESONANCE OF DISC RECORD TONE ARMS

[76] Inventor: Alexander R. Rangabe, Stoneacre, Denmead, Portsmouth, England

[21] Appl. No.: 659,841

[22] Filed: Feb. 20, 1976

[30] Foreign Application Priority Data

Feb. 28, 1975 [GB] United Kingdom ............... 8476/75

[51] Int. Cl.² .............................................. G11B 3/30
[52] U.S. Cl. ................................... 274/23 R; 274/37
[58] Field of Search ............... 274/23 R, 24 R, 24 A, 274/37, 15

[56] References Cited

U.S. PATENT DOCUMENTS

| | | | |
|---|---|---|---|
| 2,572,712 | 10/1951 | Fisher | 274/23 R |
| 2,716,551 | 8/1955 | Bachman | 274/24 A |
| 3,228,700 | 1/1966 | Andrews et al. | 274/23 R |
| 3,301,565 | 1/1967 | Bachman | 274/23 R |
| 3,830,505 | 8/1974 | Rabinow | 274/23 R |

Primary Examiner—Steven L. Stephan
Attorney, Agent, or Firm—Browdy and Neimark

[57] ABSTRACT

This invention provides a damper for damping the resonance of a disc record tone arm comprising first and second relatively movable elements in engagement with energy absorbing material. The first element is secured relatively to the tone arm cartridge while the second element engages the record surface so as to be movable relatively thereto. The damper applies resistive force between the record surface and the cartridge to reduce variation in tracking force as the stylus traverses warps in the record surface.

27 Claims, 7 Drawing Figures

DAMPER MEANS FOR DAMPING THE RESONANCE OF DISC RECORD TONE ARMS

This invention relates to damper means for damping the resonance of disc record tone arms. The expression "tone arm" is employed herein to comprehend a structure in which a limb carries at one end thereof a cartridge fixedly secured against vertical movement relatively thereto in which is mounted a stylus compliance for engaging the spiral trace of a disc record whilst at its end remote from the cartridge the limb is adapted for pivotal support in respective planes parallel and normal to the disc record.

The ability of the stylus satisfactorily to track a disc record trace can be appreciably affected by the presence of warp in the record. The cartridge and stylus compliance can be thought of as a mass with a spring supporting the mass on the record surface and it will, accordingly, be appreciated that as warps are traversed, a short term cyclical increase and decrease in tracking force results which if great enough can cause poor tracing or mistracking or, in extreme cases, groove jumping by the stylus. Vertical movements of the stylus can occur because of warps which are much greater than the amplitude of vibrations arising from tracking and can occasion audible intermodulation products. In side thrust compensated arrangements variation, as described, in tracking force may give rise to short term change in side thrust. Distortions can further arise owing to short term change in the stylus vertical tracking angle and owing to warp wow, i.e. variation in frequency due to stylus movement in the circumferential direction of the trace.

Previous attempts have been made to minimize tracking imperfections arising from record warps by judicious application of damping. Thus damping has been applied to the stylus compliance but such damping, if it is not to become self-defeating by reason of affecting audio tracing performance, has to be kept to an absolute minimum and, accordingly, tends to be insufficient.

Damping has also been applied between the arm and the base board but this system has the drawback that if sufficient mechanical resistance is connected across the arm pivot to provide adequate damping at resonance, low frequency warps, which correspond with the range in which warp velocities imparted to the stylus are very high and in which most warps occur, produce a large damping effect so that excess forces are applied to the stylus which degrade tracking performance.

A further known form of damping employs the so-called "damped dynamic vibration absorber". This involves attaching to the system via a suitably damped compliance an auxiliary mass which is substantially smaller than the cartridge mass. The resulting system has two resonance peaks on either side of the single peak of the original system. With most existing tone arms the lower frequency resonance peak of the system damped in this way occurs in the region of high warp velocities which is a very unsatisfactory arrangement.

It is, accordingly, an object of this invention to provide improved damper means for damping the resonance of disc record tone arms.

The present invention consists in damper means for damping the resonance of a disc record tone arm of the kind having a limb adapted at one end for pivotal support in respective planes parallel with and normal to the plane of the record and a cartridge mounted on the limb at a location remote from said end adapted for pivotal support, the cartridge being secured against vertical movement relatively to the limb, said damper means comprising first and second relatively movable elements in engagement with energy absorbing material therebetween, the first element in the operative position of the damper means being secured relatively to the tone arm cartridge whilst the second element extends toward the plane of the record, there being provided on the second element a skid formed of a material of sufficient rigidity and providing a sufficient contact area with the record as to inhibit tracking by the skid of the record trace, thereby to permit sliding movement of the skid transversely of the record trace the damper being adapted to apply resistive force between the record and the cartridge to reduce variation in tracking force as the stylus traverses warps in the record surface.

Suitably, the damper is adapted so that the second element thereof engages the record surface on the record center side of and close to the point of contact of the stylus with the record. Advantageously, the engagement of the second element with the record surface is on the record radius intersecting the point of contact of the stylus with the record. Preferably, the second element of the damper is adapted to engage the record surface over an area sufficient to avoid tracking of the second element in the record trace.

In one form of the invention the first element is a plunger and the second element is a dashpot in which the plunger extends, the dashpot containing energy absorbing fluid in which the plunger is immersed and being loaded to maintain resistive force between the record surface and the cartridge throughout warp traverse by the stylus.

Suitably, the dashpot is provided on its base with a skid for engaging the record surface.

Preferably, the skid is of softer material than the record surface and is shaped to afford in operation an area of contact with the record surface which, on wearing of the skid during sliding contact with the record surface, remains substantially constant.

In another form of the invention, the first and second elements are relatively rotatable about a common axis and the second element includes a pre-loaded skid which is offset from the common axis. Where the energy absorbing material is fluid or visco-elastic material the skid can be mass loaded or in the case of visco-elastic material the skid can be loaded by stressing in the operative position of the damper of the visco-elastic material between the first and second damper elements.

Figure 2:
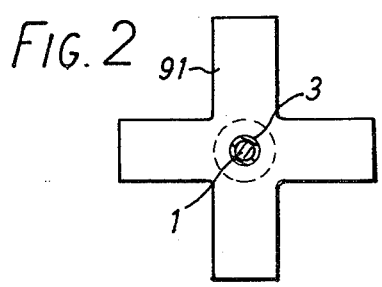
Figure 3:
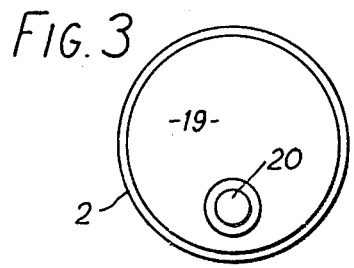
Figure 4:
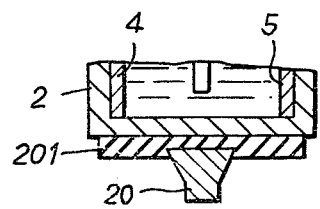
Figure 7:
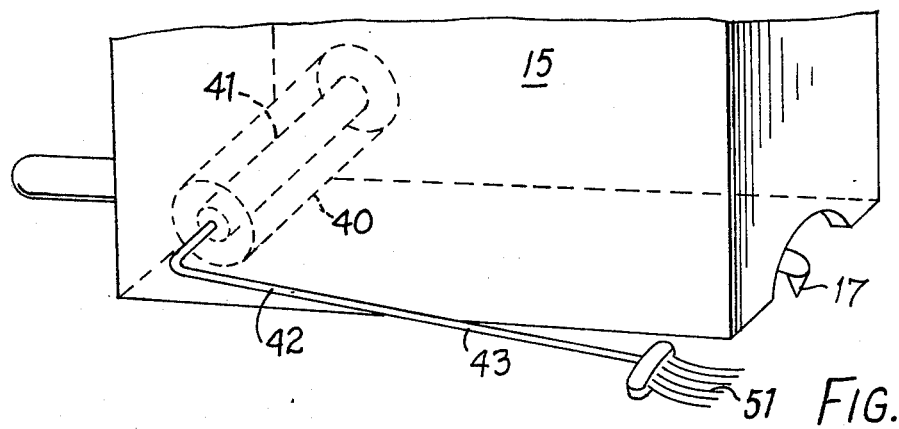
Figure 5:
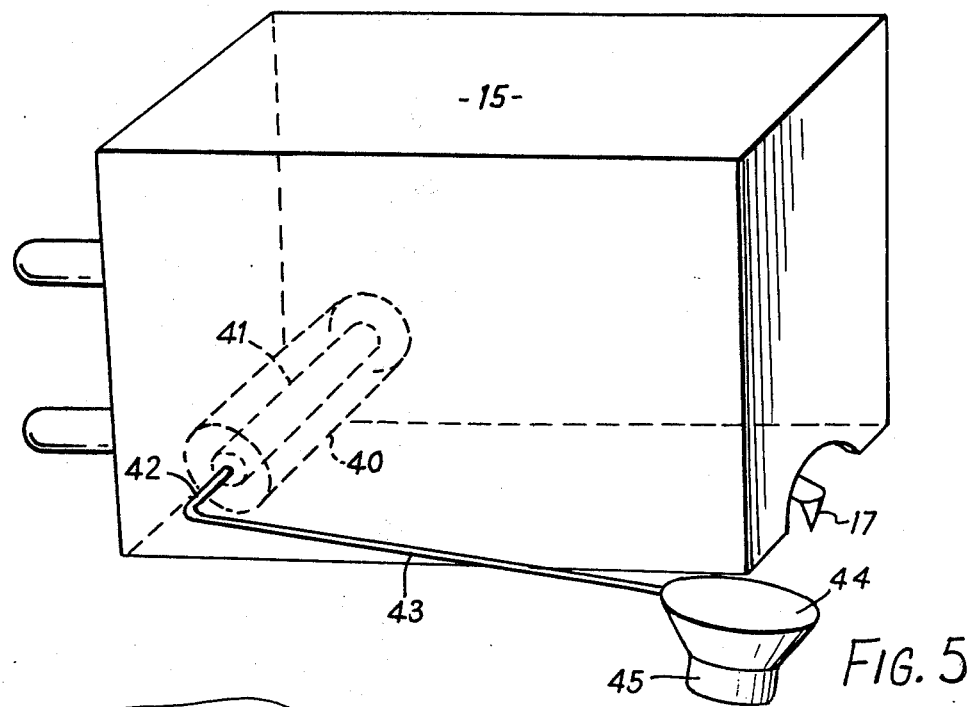
Figure 6:
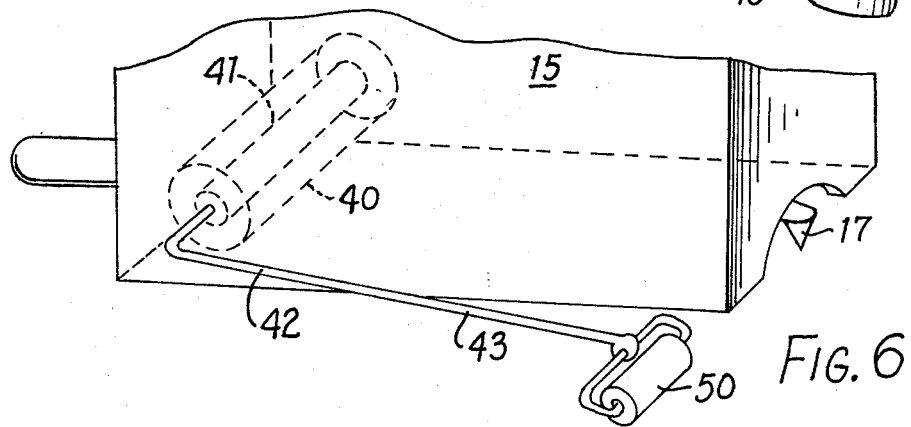

The invention will now be described by way of example with reference to the accompanying, somewhat diagrammatic drawings, in which:

FIG. 1 is a sectional elevation to an enlarged scale of about 10:1 of a damper means according to the invention mounted in relation to the cartridge of a tone arm, FIGS. 2 and 3 are views on the lines II—II and III—III respectively of FIG. 1, FIG. 4 is a scrap view of a slightly modified form of the damper means of FIG. 1, FIG. 5 is an isometric view of a further embodiment of the invention and, FIGS. 6 and 7 are scrap views illustrating modifications of the embodiment of the invention of FIG. 5.

In the drawings, like parts have been accorded the same reference numerals.

Referring first to FIGS. 1, 2 and 3, a damper means according to the invention has first and second relatively movable elements in the form of a plunger 1 and a cylindrical dashpot 2 within which the plunger is axially movable. The plunger is in the form of a stem of diameter approximately 0.25 mm which projects from the upper end of the dashpot 2 and an upper part of which fits closely within a length of hypodermic tube 3. The dashpot comprises a drawn metal cylinder, the internal diameter of which is 4mm whilst the height of the cylinder internally is 5.5 mm. Towards its lower end the cylinder is provided with a partition in the form of an inverted cup shaped element 4 formed of plastic material, suitably nylon, and having a cylindrical side wall 5 which fits closely within the cylinder and a centrally apertured downwardly tapering top wall 6 the central aperture 7 of which affords a bearing for the lower end of the plunger 1. The downwardly tapering top wall 6 serves to form a well around the plunger stem. The upper end of the cylinder is closed by a plastic, suitably nylon, stopper 8 formed with a central aperture 7a of diameter slightly greater than the diameter of the tube 3 containing the plunger 1 and coaxial with the aperture 7 in the element 4. The dashpot cylinder 2 is filled to a level above the aperture 7 but below the top of the element 4 with a fluid of high viscosity, for example, di-methyl silicone fluid of viscosity, typical values of which, depending on the weight of the associated tone are in the range 30,000 to 75,000 centistokes. The lower the weight of the tone arm, the lower the viscosity of the fluid and the lower the weight of the cylinder 2 employed. The top section of the wall of the cylinder between the element 4 and the nylon stopper 8 is coated with a film of p.t.f.e. or other suitable fluorocarbon which prevents creep of viscous fluid from the lower part of the cylinder. The upper end of the plunger stem and its containing tube 3 is secured in a screw 9 which is externally threaded and retained in a bushing 10 which is internally threaded and secured in an aperture of a lower horizontal part 12 of a plate 11 which is connected to an upper horizontal part 13 thereof by a vertical portion 14 of the plate. The threads of the bushing 10 and screw 9 afford height adjustment of the cylinder 2 enabling the damper to be correctly set for cartridges of different height. To facilitate rotation of the screw 9 by means of a screwdriver from the side of the damper means, the screw 9 is formed with a cruciform head.

The damper is connected in its operative location by unfastening the fixing bolts (not shown) between the stylus cartridge 15 and the metal shell 16 at the end of the tone arm providing a mounting for the cartridge. The upper horizontal part 13 of the plate 11 on the lower horizontal part of which the stem of the damper plunger is secured, is located between the cartridge and the shell and clamped in that position by the bolts which fix the cartridge to the shell. Suitably, part 13 is formed with slots (not shown), through which the fixing bolts pass to enable adjustment of the position of the damper relatively to the cartridge stylus tip 17 in the tangential direction, with respect to the spiral trace of a record 18 engaged by the stylus tip. The center point of the damper cylinder base is, accordingly, adjusted for location about 1 cm. from the stylus tip and on the radius between the stylus tip and the turntable axis. The base of the cylinder has applied thereto a layer 19 of fluorocarbon material having approximately midway between the center and periphery of the cylinder 2 a downward projection or skid 20 the lower surface of which engages the record surface and is of sufficiently great area to ensure that no possibility arises of the damper cylinder tracking the record trace. It will be noted that the lower part of the downward projection 20 is of constant diameter so that wearing thereof does not result in increased area of contact with the record surface. The coefficient of sliding friction between the record surface and the projection or skid engaged therewith depends on the materials used for the skid as well as a number of other physical factors. Under sliding contact conditions wear of both surfaces takes place. This results in record surface material being transferred to the skid and vice versa. As a result of this exchange, the system tends to a final steady coefficient of friction which is governed by:

(a) the relative hardness of the record material and the skid material,
(b) the contact pressure between the skid and the record,
(c) the relative velocity of the record with respect to the skid.

If the skid material is softer than the record material, the skid tends to lose material at a higher rate than the record and no appreciable build up of record material takes place on the skid. Thus the dynamic coefficient of friction does not change appreciably from its initial value. On the other hand, if the hardness of the skid material is higher than that of the record material, appreciable amounts of record material become deposited on the skid and the value of the dynamic coefficient of friction tends to that of contact between two record material surfaces, which value is quite high, and produces "stick-slip" oscillations and hence, noise.

The coefficient of sliding friction tends to be unsatisfactorily high when the contact area is made large. Moreover, the coefficient of friction increases if the contact pressure is further reduced in consequence of wear increasing the area of contact. By providing the skid 20 in a form in which the lower part thereof is of uniform cross-sectional area so that wearing thereof does not increase the contact area with the record surface and by making the skid of a plastics material having a low coefficient of friction against the record material and which is softer than the record material and, further, by making the area of contact of the skid 20 with the record surface large enough to avoid groove tracking but less than a value which would give too low a contact pressure, the conditions are established which produce a satisfactory value for the coefficient of sliding friction. The preferred material for the skid 20 is, as has been mentioned, a fluoro-carbon material, e.g. p.t.f.e. However, polyethylene is also suitable but has a somewhat higher coefficient of friction. The preferred diameter of the lower portion of the skid 20 is 0.5 mm.

Under certain conditions it may be desirable to mount the p.t.f.e. skid 20 in a rubber plinth 201 (see FIG. 5) rather than the p.t.f.e. layer 19 illustrated in FIG. 1. The skid 20 both in the arrangement of FIG. 4 and in that of FIGS. 1 to 3 is located, with respect to the direction of record rotation ahead of the axis of the cylinder 2. This means that upon contact of the skid with the record surface the cylinder 2 rotates to present the contact face of the skid to the record surface in a constant orientation.

The form of damper described provides a total plunger travel of about 1.5 mm. and when the base of the cylinder rests on an unwarped portion of a record the plunger disc is in the mid-point of this travel. These dimensions enable the damper to cope with warps of amplitude far greater than anything likely to be encountered in practice even if the set height adjustment effected for any particular cartridge by the screw 9 has not been accurately performed.

Located on the plunger stem above the element 4 and within a downwardly extending cylindrical projection 22 on the stopper 8 is a baffle in the form of a disc 23 of or coated with p.t.f.e. or other suitable fluoro-carbon material which serves to prevent creep of the viscous fluid along the plunger stem. Together with the projection 22, the baffle disc 23 prevents escape of viscous fluid through the central aperture of the stopper 8.

The damper described when operatively mounted provides by its moving parts, i.e. the cylinder and its content of viscous fluid, a mass loading of 0.4 gm at an unwarped part of the record surface. This ensures that contact between the record surface and the cartridge is maintained under the most severe warp conditions likely to be encountered.

In the embodiment of the invention shown in FIG. 5, the first element of the damper comprises a cylinder 40 which is horizontally disposed within the cartridge 15. The second element includes a cylinder 41 which extends axially within the first element and is rotatable relatively to the axis of that element. The cylinder 41 of the second element terminates in a stem 42 which projects beyond the side of the cartridge which is adjacent the turntable axis. At its end remote from the cylindrical first element of the damper, the stem is attached to one end of a lever 43, the other end of which is provided with a skid mounting 44 on which is carried a downwardly projecting skid 45 of similar size and material to the skid 20 of FIGS. 1 to 4 and which in operation of the damper engages the record surface. Between the cylindrical first and second elements of the damper, the cylindrical first element is filled with either a very high viscosity fluid (e.g. the silicone fluid mentioned above) or with a visco-elastic material. The skid 45 which engages the record surface is either mass loaded or loaded by torsional forces in the material between the cylinders. The point of contact of the skid with the record surface is about 1 cm from the stylus tip and on the radius of the record containing the stylus tip.

In each embodiment of the invention described the preferred point of contact of the damper with the record surface has been specified as lying on the radius of the record containing the stylus tip and about 1 cm on the record center side of the stylus tip. This location is preferred because the damper contact point moves along a record warp substantially in phase with the stylus tip. Also if the tone arm is suddenly lowered the damper cushions the shock on the stylus and if the tone arm is moved laterally the damper contacts the edge of the record before the stylus. Nevertheless the point of contact of the damper can be varied without losing the benefit of the invention. Thus locations up to 5 mm fore and aft of the described point of contact are likely to provide a measure of improvement over the undamped case. Also if it can be arranged for the damper element contacting the record surface to pass freely through the body of the cartridge close to the stylus tip either radially inwards or outwards of the tip the full benefit of the damper is obtained and significant though reduced benefit is obtained up to 5 mm fore and aft of these positions.

In both embodiments of the invention which have been described, the element of the damper contacting the record surface has the form of a skid. Instead of the skid described there could be employed, as shown respectively in FIGS. 6 and 7, a roller 50 or a brush 51, but in the latter instance the brush to avoid tracking of the record trace would require to be highly compliant and this would adversely affect the performance of the damper.

The provision of the damper means according to the invention significantly improves the tracking performance of a stylus especially on a warped record. By introducing resistive force between the record surface and the cartridge, the damping means according to the invention effects reduction in variation of the tracking force as the stylus traverses warps in the record surface. Moreover reduction of "rumble" is noticeably achieved, "rumble" being intermodulation of random low frequency noise arising from turntable imperfections with the frequencies recorded in the record trace.

I claim:

1. Damper means for damping the resonance of a disc record tone arm of the kind having a limb, adapted at one end for pivotal support in respective planes parallel with and normal to the plane of the record, and a cartridge including a stylus, said cartridge being mounted on the limb at a location remote from said end adapted for pivotal support, and being secured against vertical movement relatively to the limb, the damper means comprising:

a first element, secured relatively to the tone arm cartridge;

a second element in relatively movable engagement with said first element and extending toward the plane of the record in the operative position of the damper means;

energy absorbing means, comprising energy absorbing material, disposed between said first and second elements, for causing resistive force to be applied with respect to relative movement between said first and second element; and skid means, connected to said second element for causing the damper means to come into direct mechanical contact with the record, when the damper means is in the operative position thereof, in such a manner that the damper means can slide transversely of the record trace without significant tracking of the record trace by the damper means, whereby variation in tracking force is reduced as the stylus traverses warps in the record surface.

2. Damper means as claimed in claim 1, wherein said first element is secured relatively to the tone arm cartridge at a position such that said skid means, during operation of the damper means, engages the record surface on the record center side of, and close to, the point of contact of the stylus with the record.

3. Damper means as claimed in claim 2, wherein said first element is so positioned that contact between said skid means and the record surface is on or substantially on the record radius intersecting the contact point of the stylus.

4. Damper means in accordance with claim 1, wherein said skid means comprises a skid formed of a solid material of sufficient rigidity and providing a sufficient contact area with the record as to inhibit tracking by the skid of the record trace.

5. Damper means as claimed in claim 4, wherein said skid connected to said second element is formed of a softer material than the material of the record surface.

6. Damper means as claimed in claim 5, wherein said skid is shaped so that on wearing thereof through sliding contact with the record surface, the contact area between said skid and the record surface remains substantially constant.

7. Damper means in accordance with claim 4, wherein said skid is composed of a fluoro-carbon material of polyethylene.

8. Damper means in accordance with claim 7, wherein said skid is composed of polytetrafluoroethylene or polyethylene.

9. Damper means in accordance with claim 4, wherein the portion of said skid which contacts the record has a diameter of about 0.5 mm.

10. Damper means in accordance with claim 4 wherein said skid has a low coefficient of friction against the record material and has a contact area with the record surface which is sufficiently large to inhibit tracking of the record trace and small enough to ensure that contact pressure is maintained at an adequate level.

11. Damper means as claimed in claim 1, wherein said first and second relatively movable elements comprise a plunger and dashpot respectively, said skid means being formed on the base of said dashpot, and said energy absorbing means comprises a charge of viscous enargy absorbing fluid in which said plunger extends in a manner such that resistive force is maintained between the record surface and the cartridge throughout warp traverse by the cartridge stylus.

12. Damper means as claimed in claim 11, further including mounting means, connected between said plunger and said tone arm cartridge, for affording adjustment of the axial position of said plunger relatively to the tone arm cartridge.

13. Damper means as claimed in claim 12, wherein said mounting means comprises an internally threaded bushing secured with respect to said tone arm cartridge and a screw engaged in said bushing and to which said plunger is secured.

14. Damper means as claimed in claim 13, wherein said screw is formed with an enlarged head to facilitate rotary adjustment thereof.

15. Damper means as claimed in claim 11, wherein said viscous energy absorbing fluid is silicone fluid of viscosity in the range 30,000 to 75,000 centistokes.

16. Damper means as claimed in claim 11, wherein said skid means is provided on a flexible mounting carried on said dashpot.

17. Damper means in accordance with claim 11, wherein said skid means comprises a skid formed of a material of sufficient rigidity and providing a sufficient contact area with the record as to inhibit tracking by the skid of the record trace.

18. Damper means as claimed in claim 17 wherein said skid is of softer material than the record surface and is shaped to afford in operation an area of contact with the record surface which, on wearing of said skid during sliding contact with the record surface, remains substantially constant.

19. Damper means as claimed in claim 18, wherein said skid is located between the dashpot axis and the dashpot periphery and, in operation, is ahead in the sense of record rotation of the dashpot axis.

20. Damper means as claimed in claim 1, wherein first and second elements are mounted on the tone arm cartridge and are relatively rotatable with respect to one another about a common axis and said skid means is pre-loaded and is offset with respect to the common axis.

21. Damper means as claimed in claim 20, wherein said skid means in operation is located forwards in the sense of record rotation of the common axis of the first and second elements.

22. Damper means in accordance with claim 20, wherein said skid means comprises a skid formed of a material of sufficient rigidity and providing a sufficient contact area with the record as to inhibit tracking by the skid of the record trace.

23. Damper means as claimed in claim 22, wherein said skid is of softer material than the record surface and is shaped to afford in operation an area of contact with the record surface which, on wearing of said skid during sliding contact with the record surface, remains substantially constant.

24. Damper means as claimed in claim 23, wherein said energy absorbing material between said first and second elements is a viscous fluid.

25. Damper means as claimed in claim 23, wherein said energy absorbing material is visco-elastic material and said skid is loaded by stressing in the operative position of the damper of the visco-elastic material.

26. Damper means in accordance with claim 1, wherein said skid means comprises a roller making direct mechanical rolling contact with the record when the damper means is in the operative position thereof.

27. Damper means in accordance with claim 1, wherein said skid means comprises a brush making direct mechanical sliding contact with the record when the damper means is in the operative position thereof, said brush having sufficient compliance to permit sliding transversely of the record without significant tracking thereof.

* * * * *